US011948456B2

(12) United States Patent
Schinkel et al.

(10) Patent No.: US 11,948,456 B2
(45) Date of Patent: Apr. 2, 2024

(54) METHOD OF CONTROLLING A TRAFFIC SYSTEM, APPARATUS, COMPUTER PROGRAM, AND COMPUTER-READABLE STORAGE MEDIUM

(71) Applicant: Fujitsu Technology Solutions Intellectual Property GmbH, Munich (DE)

(72) Inventors: Fritz Schinkel, Munich (DE); Markus Kirsch, Munich (DE)

(73) Assignee: Fujitsu Technology Solutions GmbH, Munich (DE)

( * ) Notice: Subject to any disclaimer, the term of this patent is extended or adjusted under 35 U.S.C. 154(b) by 57 days.

(21) Appl. No.: 17/638,323

(22) PCT Filed: Oct. 27, 2020

(86) PCT No.: PCT/EP2020/080144
§ 371 (c)(1),
(2) Date: Feb. 25, 2022

(87) PCT Pub. No.: WO2021/089367
PCT Pub. Date: May 14, 2021

(65) Prior Publication Data

US 2022/0301426 A1 Sep. 22, 2022

(30) Foreign Application Priority Data

Nov. 6, 2019 (DE) ..................... 10 2019 129 943.8
Jun. 24, 2020 (DE) ..................... 10 2020 116 669.9

(51) Int. Cl.
*G08G 1/081* (2006.01)
*G08G 1/01* (2006.01)
*G08G 1/07* (2006.01)

(52) U.S. Cl.
CPC ........... *G08G 1/081* (2013.01); *G08G 1/0129* (2013.01); *G08G 1/07* (2013.01)

(58) Field of Classification Search
CPC ........ G08G 1/081; G08G 1/0129; G08G 1/07; G08G 1/0116; G08G 1/0133; G08G 1/0145
See application file for complete search history.

(56) References Cited

U.S. PATENT DOCUMENTS 5,357,436 A 10/1994 Chiu
6,539,300 B2 * 3/2003 Myr .................... G08G 1/0104 379/112.01

(Continued)

FOREIGN PATENT DOCUMENTS

JP 08171694 A * 7/1996
JP H08-171694 A 7/1996

(Continued)

OTHER PUBLICATIONS

Notice of Reasons for Refusal dated Apr. 25, 2023, of counterpart Japanese Patent Application No. 2022-526298, along with an English translation.

(Continued)

*Primary Examiner* — Mohamed Barakat
(74) *Attorney, Agent, or Firm* — DLA Piper LLP (US)

(57) ABSTRACT

A method of controlling a traffic system having a plurality of intersections with switchable traffic lights and road sections located between the intersections includes detecting traffic loads of multiple relevant road sections, determining a local stress function for each relevant road section depending on the detected traffic load of the respective relevant road section, determining a global stress function for the entire traffic system based on the local stress functions, determining, using a quantum concept processor, improved switching times for the traffic lights of the intersections adjacent to the (Continued)

relevant road sections, wherein the improved switching times are determined such that the global stress function reaches a smallest detectable value, and switching the traffic lights according to a switching model based on the improved switching times.

12 Claims, 2 Drawing Sheets

(56) References Cited

U.S. PATENT DOCUMENTS

| | | | | |
|---|---|---|---|---|
| 9,633,560 | B1 * | 4/2017 | Gao | G08G 1/07 |
| 10,600,320 | B2 * | 3/2020 | Sun | G08G 1/095 |
| 2007/0273552 | A1 * | 11/2007 | Tischer | G08G 1/0965 340/910 |
| 2008/0235398 | A1 * | 9/2008 | Helbing | G08G 1/07 709/243 |
| 2019/0164418 | A1 * | 5/2019 | Neukart | G08G 1/0129 |

FOREIGN PATENT DOCUMENTS

| | | | |
|---|---|---|---|
| JP | H09-326100 | A | 12/1997 |
| JP | 2003-132490 | A | 5/2003 |
| WO | 2018/141403 | A1 | 8/2018 |
| WO | 2018/224872 | A1 | 12/2018 |

OTHER PUBLICATIONS

Sanroku Tsukamoto et al., “An Accelerator Architecture for Combinatorial Optimization Problems,” Fujitsu Sci. Tech. J., vol. 53, No. 5, Sep. 2017, pp. 8-13.

Maliheh Aramon et al., “Physics-Inspired Optimization for Quadratic Unconstrained Problems Using a Digital Annealer,” arXiv:1806.08815v3 [physics.comp-ph], Apr. 7, 2019.

Hasham Hussain et al., “Optimal Control of Traffic Signals using Quantum Annealing,” Quantum Information Processing, No. 9, Aug. 24, 2020, pp. 1-18.

Decision to Grant a Patent dated Oct. 31, 2023, of counterpart Japanese Patent Application No. 2022-526298, along with an English translation.

* cited by examiner

METHOD OF CONTROLLING A TRAFFIC SYSTEM, APPARATUS, COMPUTER PROGRAM, AND COMPUTER-READABLE STORAGE MEDIUM

TECHNICAL FIELD

This disclosure relates to a method of controlling a traffic system comprising a plurality of intersections with switchable traffic lights and road sections located between the intersections, and a corresponding apparatus, a computer program, and a computer-readable storage medium.

BACKGROUND

Traffic on roads is increasing worldwide, especially in cities and crowded areas. Traffic jams, congested roads and slow traffic are not only a significant loss of time for road users, but also increasingly contribute to air pollution and health problems for residents living near the congested roads. The longer a vehicle is stuck in traffic, the more exhaust gases are released into the environment. Consequently, it would be desirable to avoid congested roads and traffic jams as much as possible.

However, a problem is that traffic systems are becoming increasingly complex, making it more and more difficult to easily control traffic in a traffic system.

There is thus a need to provide a method, an apparatus, a computer program, and a computer-readable storage medium that solves or mitigates the above-mentioned problem.

SUMMARY

We provide a method of controlling a traffic system having a plurality of intersections with switchable traffic lights and road sections located between the intersections, the method including: detecting traffic loads of multiple relevant road sections, determining a local stress function for each relevant road section depending on the detected traffic load of the respective relevant road section, determining a global stress function for the entire traffic system based on the local stress functions, determining, using a quantum concept processor, improved switching times for the traffic lights of the intersections adjacent to the relevant road sections, wherein the improved switching times are determined such that the global stress function reaches a smallest detectable value, and switching the traffic lights according to a switching model based on the improved switching times.

We also provide an apparatus that controls a traffic system with a plurality of intersections with switchable traffic lights and road sections located between the intersections, the apparatus including: at least one sensor arranged to detect traffic loads of multiple relevant road sections, a computing unit arranged to determine a local stress function for each relevant road section depending on the detected traffic load of the respective relevant road section and arranged to determine a global stress function for the entire traffic system based on the local stress functions, a quantum concept processor arranged to determine improved switching times for the traffic lights of the intersections adjacent to the relevant road sections, the improved switching times being determined such that the global stress function reaches a smallest detectable value, and a switching device arranged to switch the traffic lights in accordance with a switching model, the switching model being based on the improved switching times.

LIST OF REFERENCE SIGNS

Figure 1:
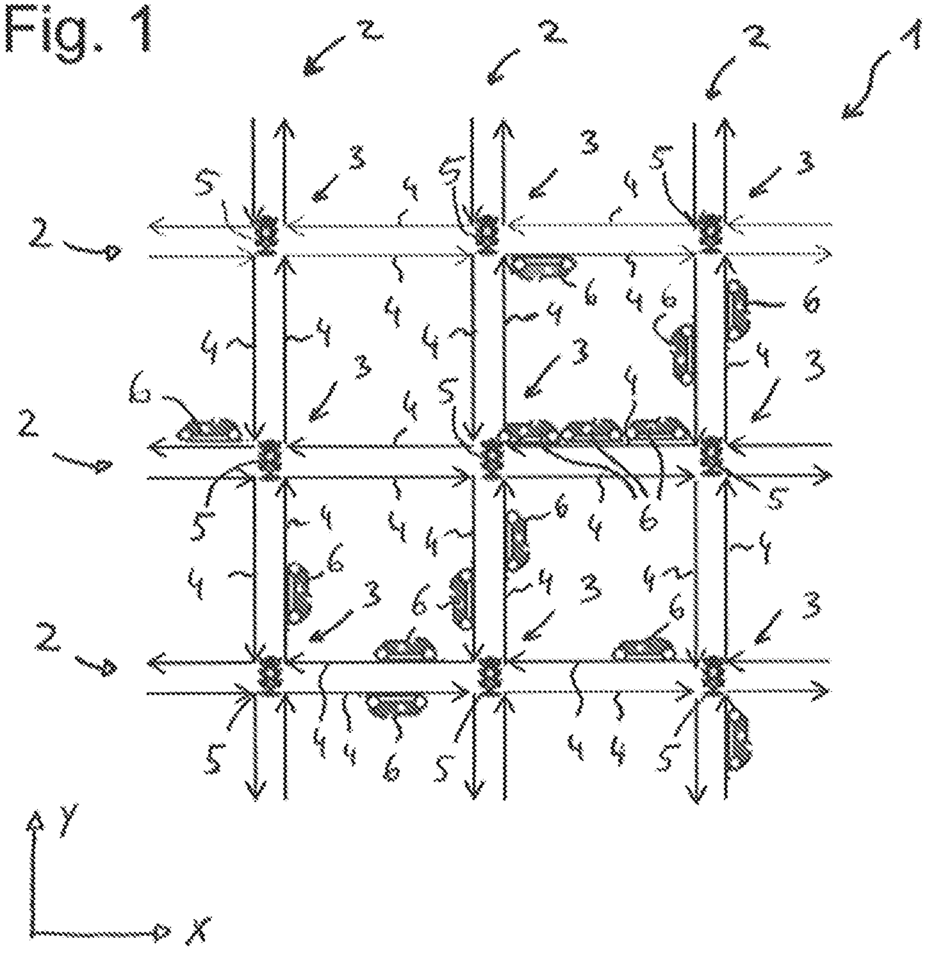
FIG. 1 shows a schematic representation of a traffic system.

1 traffic system
2 road
3 intersection
4 road section
5 traffic light
6 vehicle
7 apparatus
8 sensor
9 computing unit
10 network
11 quantum concept processor
12 switching device
x west-east direction
y south-north direction
100 method
101-105 steps

DETAILED DESCRIPTION

We provide a method of controlling a traffic system comprising a plurality of intersections with switchable traffic lights and road sections located between the intersections comprising:

- detecting traffic loads of a plurality of relevant road sections,
- determining a local stress function for each relevant road section depending on the detected traffic load of the respective relevant road section,
- determining a global stress function for the entire traffic system based on the local stress functions,
- determining, using a quantum concept processor, improved switching times for the traffic lights of the intersections adjacent to the relevant road sections, wherein the improved switching times are determined such that the global stress function reaches a smallest value that can be found, and
- switching the traffic lights adjacent to the relevant road sections according to a switching model which is based on the improved switching times.

An advantage is that, by minimizing the global stress function, switching times for the traffic lights are determined that allow traffic to flow as smoothly and with least congestion as possible. With the help of the quantum concept processor, the switching times for a large number of traffic lights are modulated simultaneously such that the global stress function becomes as low as possible in the entire traffic system under consideration. With the methods described herein, using a quantum concept processor, the determination of improved switching times can be determined particularly quickly so that a rapid reaction to increased traffic is possible, and congestion and gridlocked traffic can thus be avoided or at least reduced.

For the traffic load, vehicle densities in the relevant road sections are considered, for example. Furthermore, it is also possible, for example, to record vehicle types, vehicle sizes, and other recordable data in terms of traffic load, which can have an influence on the traffic stress on the road sections.

Traffic stress and stress functions describe variables that are, for example, a measure of congestion on a road section. For example, the stress function is calculated using a difference between the number of vehicles currently present on a road section and a maximum number of vehicles that can be tolerated without stress on the road section. Alternatively or additionally, values that are a measure of an environmental impact such as exhaust gas values can also be used to determine the stress function. The global stress function can be determined by the sum of all determined local stress functions.

As used herein, a quantum concept processor is a processor based on quantum algorithms for accelerated execution of improvement tasks. For example, this is a processor set up to solve a problem using quantum annealing simulation. Such a processor may, for example, be based on conventional hardware technology such as complementary metal-oxide-semiconductor (CMOS) technology. An example of such a quantum concept processor is the “Digital Annealer” from the company “FUJITSU.” Alternatively, however, any other quantum processors, in the future also those based on real quantum bit technologies, can be used for the procedure described herein. In other words, a quantum concept processor is a processor that realizes the concept of minimizing a QUBO (Quadratic Unconstrained Binary Optimization) function, either on a special processor in classical technology or on a quantum annealer.

As switching times for the traffic lights, ratios of red to green phases of the respective traffic lights are determined, for example.

The smallest value of the global stress function that can be found is either a local or an absolute minimum of a corresponding stress function.

The relevant road sections can be all road sections of the traffic system. Alternatively, the relevant road sections may be only a part of the road sections of the traffic system, especially if only control of specific traffic lights is interesting or possible.

The traffic lights are, for example, visual light signal systems that use corresponding color signals (red/green) to indicate to a driver of a vehicle whether he/she has to stop at an associated intersection or can pass it. Alternatively, however, the traffic lights may be other traffic lights used to control a flow of traffic. For example, they may be special traffic lights that use, for example, non-visual signals to control a traffic flow, especially if autonomous vehicles are predominant or exclusive in the traffic system.

The switching model can, for example, be based directly on the determined switching times, i.e., each traffic light is switched directly according to the switching times that have been determined as improved switching times. Alternatively, it is also possible to use a switching model that is based on these switching times but additionally takes into account further functions such as offsets of individual switching times or the like.

The global stress function may be defined as a quadratic optimization term, in particular, as a Quadratic Unconstrained Binary Optimization (QUBO) term.

Advantageously, such terms are particularly suitable for solving the problem by a quantum concept processor.

The determining of the local stress function may additionally be performed based on selected values of different possible green phases for traffic lights adjacent to the respective relevant road section.

Different possible green phases for the traffic lights each describe the red-to-green ratio of the respective traffic lights. Different possible green phases can be, for example: 40% green to 60% red; 50% green to 50% red; 70% green to 30% red, as well as any other distribution of red and green times with respect to each other. Adjacent traffic lights are the traffic lights immediately adjacent to the relevant road section, but may also include all traffic lights existing at the intersections adjacent to the relevant road section.

The method may further comprise:

loading historical data of the traffic system, wherein further the determining of the local stress functions is performed taking into account the historical data.

Advantageously, the traffic system can additionally be controlled based on empirical values about the traffic system. This way, for example, more accurate local stress functions can be determined. For example, historical data is used to define a maximum traffic flow at each intersection, or determine a value for each switching period that corresponds to the number of vehicles choosing a specific route. Furthermore, the historical data can be used to more precisely determine the traffic load for each switching period, or specify boundary conditions of the traffic system such as how many new vehicles appear at each road section located at an edge per switching period. Alternatively or additionally, periodic boundary conditions can be chosen for such boundary conditions, i.e., the assumption can be made that the same number of vehicles leave the traffic system as new ones appear in the traffic system.

Determining the local stress functions, determining the global stress function, determining the improved switching times, and switching the traffic lights may be periodically repeated and the improved switching times are always determined for a next switching period. Further, alternatively or additionally, the recording of the traffic loads may be periodically repeated.

It is advantageous that improved switching times can be determined continuously and thus it is possible to react to changes in the traffic system. For example, these values are redetermined every 90 seconds. Alternatively, shorter or longer time intervals can be selected, for example, adapted to traffic times such as rush hour or holiday and public holiday traffic.

We also provide an apparatus that controls a traffic system comprising a plurality of intersections with switchable traffic lights and road sections located between the intersections comprising:

at least one sensor adapted to detect traffic loads of a plurality of relevant road sections, a computing unit arranged to determine a local stress function for each relevant road section depending on the detected traffic load of the respective relevant road section and arranged to determine a global stress function for the entire traffic system based on the local stress functions, a quantum concept processor arranged to determine improved switching times for the traffic lights of the intersections adjacent to the relevant road sections, wherein improved switching times are determined such that the global stress function reaches a smallest value that can be found, and a switching device arranged to switch the traffic lights according to a switching model, the switching model being based on the improved switching times.

Suitable sensors here are, for example, sensors arranged to continuously record the traffic loads of the relevant road sections in real time. The computing unit may further be arranged to determine the local stress function for each relevant road section additionally as a function of traffic loads predicted for different switching times of the respective relevant road section.

We further provide a computer program, the computer program comprising instructions which, when the program is executed by a computer arrangement, cause the computer arrangement to perform the method.

We still further provide a computer-readable storage medium comprising a computer program.

Examples of the method may also be present in the apparatus, program, and storage medium, and vice versa, and have corresponding effects.

Examples are described in more detail below with reference to the schematic drawings.

FIG. 1 shows a schematic drawing of a traffic system 1. The traffic system 1 is shown in a highly simplified form for ease of description. However, this highly simplified representation is not intended to be a limitation of this disclosure.

The traffic system 1 comprises a plurality of roads 2. The roads 2 run in both an east-west direction and a north-south direction. Each meeting of two roads 2 constitutes an intersection 3.

The intersections 3 are numbered consecutively for the purpose of mathematical description. "n" denotes the intersections 3 in the west-east direction, "m" the intersections 3 in the south-north direction. The west-east direction corresponds to the x-direction of the coordinate system shown in FIG. 1, the south-north direction corresponds to the y-direction of the coordinate system. "n" runs from 0 to N−1, where N represents the total number of roads 2 running in the south-north direction y. "m" runs from 0 to M−1, where M represents the total number of roads 2 running in the west-east direction x.

Between the intersections 3, the roads 2 are formed by road sections 4. At each intersection 3, four incoming road sections 4 arrive and four outgoing road sections 4 depart. The incoming and outgoing road sections 4 are numbered according to their orientation:

East direction (positive x-direction): 0

North direction (positive y-direction): 1

West direction (negative x-direction): 2

South direction (negative y-direction): 3.

The road sections 4 can now each be described as an incoming or outgoing road section 4 of an intersection 3 or as an outgoing or incoming road section 4 of a corresponding adjacent intersection 3:

$out_{n,m,0}=in_{(n+1)modN,m,2}$ $out_{n,m,1}=in_{n,(m+1)modM,3}$ $out_{n,m,2}=in_{(n-1)modN,m,0}$ $out_{n,m,3}=in_{n,(m-1)modM,m,1}$.

"modN" and "modM" are used to denote periodic boundary conditions.

The description of the method and the apparatus will each be based on the outgoing road sections 4. An equivalent consideration of the incoming road sections 4 is alternatively of course also possible.

For the purpose of a simpler description, in the example shown herein, a switchable traffic light 5 is located at each intersection 3, which communicates with road users by light signals. On the road sections 4 there are vehicles 6 that travel the roads 2 and pass the traffic lights 5 or stop at them.

In the example, a traffic load $l_{n,m,d}(t)$ denotes a number of vehicles 6 on an outgoing road section 4 "$out_{n,m,d}$" at a time t.

For discrete steps along the roads 2 in the traffic system 1 in west-east direction x or south-north direction y, the following auxiliary functions are defined:

xd: {0,1,2,3}→{−1,0,1}; xd(0)=1, xd(1)=0, xd(2)=−1, xd(3)=0 yd: {0,1,2,3}→{−1,0,1}; yd(0)=0, yd(1)=1, yd(2)=0, yd(3)=−1.

For example, xd(0) represents a step in the east direction, yd(3) represents a step in the south direction, i.e., in the negative y direction and so on.

A global stress function S, which provides a value for overload of the traffic system 1, is the sum over local stress functions f of the individual road sections 4. The global stress function S can be defined as:

$$S(t) = \sum_{n=0}^{N-1}\sum_{m=0}^{M-1}\sum_{d=0}^{3} f_{n,m,d}(l_{n,m,d}(t)).$$

$l_{n,m,d}(t)$ is the traffic load and fn,m,d are the local stress functions of the road sections 4, whose position is characterized by the indices n and m, and whose direction is characterized by the index d. The dependence of the respective local stress function is chosen to simplify the description. To determine a stress function, the method can take into account several different parameters that can be assigned to the respective roads, e.g., the currently drivable speed and/or the current $CO_2$ emissions.

For simplicity, in the example the local stress functions f are defined as:

$$f_{n,m,d}(l_{n,m,d}):=(\max(0,l_{n,m,d}-V_R))^2.$$

$V_R$ is a constant corresponding to a maximum number of vehicles 6 that can be on a particular road section 4 without causing excessive traffic on the particular road section 4 that could lead to congestion or gridlocked traffic. In other words, $V_R$ is the maximum number of vehicles 6 that can be on a specific road section 4 without causing stress. For simplicity, the same constant $V_R$ is assumed for all road sections 4 in the example shown.

The local stress functions f can be made arbitrarily complex and can be set up according to the needs and requirements for a desired traffic improvement (e.g., reduction of traffic jams, reduction of exhaust gas concentrations and the like) for the traffic system 1. In addition to a traffic load, the stress function can also depend on many other influencing variables such as traffic throughput, exhaust emissions, noise and the like. For example, the local stress functions f can be adapted to real conditions in a real traffic system, for example, by using road-specific thresholds and progressive functions.

The definition for the local stress functions f provides a value of 0 as long as the number of vehicles 6 on the road section 4 is below the constant $V_R$. If the number of vehicles 6 on the road section 4 is above the constant $V_R$, the local stress increases as the number of vehicles 6 increases.

The global stress function in the example is then defined as:

$$S(t) = \sum_{n=0}^{N-1}\sum_{m=0}^{M-1}\sum_{d=0}^{3}(\max(0,\ l_{n,m,d}(t) - V_R))^2.$$

Only the outgoing road sections 4 at each intersection 3 are taken into account, as otherwise, due to the summation over all intersections 3 and all directions d, all road sections 4 would be counted twice.

For the purpose of a simply understandable description, it is further assumed here that all traffic lights 5 have a common clock cycle and an influence of phase shifts between the traffic light systems 5 is neglected. Alternatively, however, phase shifts between the clock cycles of the traffic lights 5 and/or different clock cycles can of course also be taken into account.

A proportion of a green phase $\lambda_{n,m}$ in a cycle time $T_P$ of a special traffic light 5 is modelled, for example, in R steps r. r is a natural number from 0 to R−1, where R is the total number of steps r. The cycle time $T_P$ of a traffic light 5 is, for example, the time, in seconds, from the beginning of a red phase to the beginning of the next red phase of the traffic light 5. In the example, a fixed cycle time $T_P$ is assumed, which is also clocked simultaneously for all traffic lights 5 for the purpose of a simple description. Alternatively, the cycle time $T_P$ can also vary for the individual traffic lights 5 or be additionally improved with the method shown here. For this purpose, the cycle time $T_P$ could also be taken into account via the local stress functions $f_{n,m,d}$.

The green phase $\lambda_{n,m}$ is defined as $$\lambda_{n,m} = \frac{r}{R-1}$$

and indicates the proportin of the cycle time $T_P$ for which the traffic light 5 of a specific intersection 3 is switched to green in the west-east direction x. Furthermore, $T_C$ is a so-called clearing time, which indicates in seconds how much time elapses between a switching of the traffic light 5 and a clearing of the associated intersection 3. $T_T$ is a traffic time that indicates in seconds the time during which vehicles 3 can actually pass the intersection 3. The traffic time $T_T$ is calculated from: $T_T := T_P - 2T_C$. Furthermore, a traffic flow F indicates how many vehicles 6 can pass an intersection 3 in one direction d during one green phase per second.

The traffic load 1 of a specific road section 4 in the west-east direction x for a next time t+1 then results from the current traffic load 1 on this road section 4 at time t, i.e., at the next cycle time $T_P$ plus an incoming traffic of a neighboring road section 4, and minus an outgoing traffic to another neighboring road section 4:)

$$l_{n,m,0}(t+1) = l_{n,m,0}(t) + \min(l_{(n-1)mod\,N,m,0}(t), \lambda_{n,m} F T_T) - \min(l_{n,m,0}(t), \lambda_{(n+1)mod\,N,m} F T_T)$$

The incoming and outgoing traffic is defined here respectively as a minimum function, whereby either the total incoming or outgoing traffic load l is taken into account if this is smaller than the maximum possible incoming or outgoing traffic via the respective traffic light 5, or otherwise the maximum possible incoming or outgoing traffic is taken into account.

The traffic load l and consequently the local stress function f of a road section 4 thus depends on which values are chosen for the green phase $\lambda_{n,m}$ of an intersection n,m adjacent to the road section 4 and which values are chosen for the green phase $\lambda_{(n+1)modN,m}$ of a neighboring intersection n+1,m adjacent to the road section 4.

If $r_C$ is the value for r of a green phase $\lambda_{n,m}$ with respect to a central intersection and $r_O$ is the value for r of a green phase $\lambda_{(n+1)mod\,N,m}$ with respect to an intersection adjacent to the central intersection, the result is:

$$(\lambda_{n,m}, \lambda_{(n+1)modN,m}) = \left(\frac{r_{n,m}}{R-1}, \frac{r_{(n+1)modN,m}}{R-1}\right) = \left(\frac{r_C}{R-1}, \frac{r_0}{R-1}\right) \in \left\{\frac{r}{R-1} \,\middle|\, r = 0, 1, \ldots, R-1\right\}^2$$

With $r_O$ and $r_C$, the traffic load l on the road section 4 emanating from the intersection n,m in the east direction x at time t+1 is obtained as follows:

$$l_{n,m,0}^{r_C,r_O}(t+1) = l_{n,m,0}(t) + \min\left(l_{(n-1)modN,m,0}(t), \frac{r_C}{R-1} F T_T\right) - \min\left(l_{n,m,0}(t), \frac{r_O}{R-1} F T_T\right)$$

In general, for all directions d, this term can be written as follows:

$$l_{n,m,d}^{r_C,r_O}(t+1) = l_{n,m,d}(t) + \min\left(l_{(n-xd(d))modN,(m-yd(d))modM,d}(t), \frac{(R-1)yd(d)^2 + (-1)^{(yd(d)^2)} r_C}{R-1} F T_T\right) - \min\left(l_{n,m,d}(t), \frac{(R-1)yd(d)^2 + (-1)^{(yd(d)^2)} r_O}{R-1} F T_T\right)$$

The local stress function for an outgoing road section 4 from intersection 3 with indices "n,m" in direction d at time t+1 is then:

$$f_{n,m,d}^{\,vo,vo}(t+1) = (\max(0, l_{n,m,d}^{\,ro,ro}(t+1) - V_R))^2.$$

The local stress functions f shown are based, for the purpose of an easily understandable description, on relatively simple assumptions regarding traffic system 1. However, the local stress functions f can be extended and can be represented in any complexity, in particular to improve adaptation to real traffic systems. For this purpose, for example, historical data can also be taken into account for the local stress functions f, which are collected, for example, via statistical evaluations regarding the traffic system 1 or by artificial intelligence methods. It is also possible to continuously adjust the local stress functions f, for example, based on such historical data at runtime.

All possible values for the green phases λ can then be represented in a bit model. If a certain value for $$\frac{r}{R-1}$$

is selected for a specific traffic light 5, a corresponding bit $x_{n,m,r}=1$. If another value is selected for the traffic light 5, $x_{n,m,r}=0$.

However, exactly one value for the green phase λ must be selected for each traffic light 5, i.e., exactly one of the bits $x_{n,m,r}$ (r=0, 1, . . . , R−1) must be equal to 1, while the others are 0. This occurs when $H_0$ is minimized:

$$H_0 = \sum_{n=0}^{N-1}\sum_{m=0}^{M-1}\left(1 - \sum_{r=0}^{R-1} x_{n,m,r}\right)^2.$$

$H_0$ is minimal in this example at $H_0=0$.

To minimize the global stress of traffic system 1, $$\frac{r}{R-1}$$

must be chosen such that $H_1$ or H is minimized:

$$H_1 = \sum_{n=0}^{N-1}\sum_{m=0}^{M-1}\sum_{d=0}^{3}\sum_{r_C=0}^{R-1}\sum_{r_O=0}^{R-1} f_{n,m,d}^{r_C,r_O}(t+1)x_{n,m,r_C}x_{(n+xd(d))modN,(m+yd(d))modM,r_O}$$

$$H = AH_0 + BH_1 = A\sum_{n=0}^{N-1}\sum_{m=0}^{M-1}\left(1-\sum_{r=0}^{R-1}x_{n,m,r}\right)^2 +$$

$$B\sum_{n=0}^{N-1}\sum_{m=0}^{M-1}\sum_{d=0}^{3}\sum_{r_C=0}^{R-1}\sum_{r_O=0}^{R-1} f_{n,m,d}^{r_C,r_O}(t+1)x_{n,m,r_C}x_{(n+xd(d))modN,(m+yd(d))modM,r_O}$$

Figure 2:
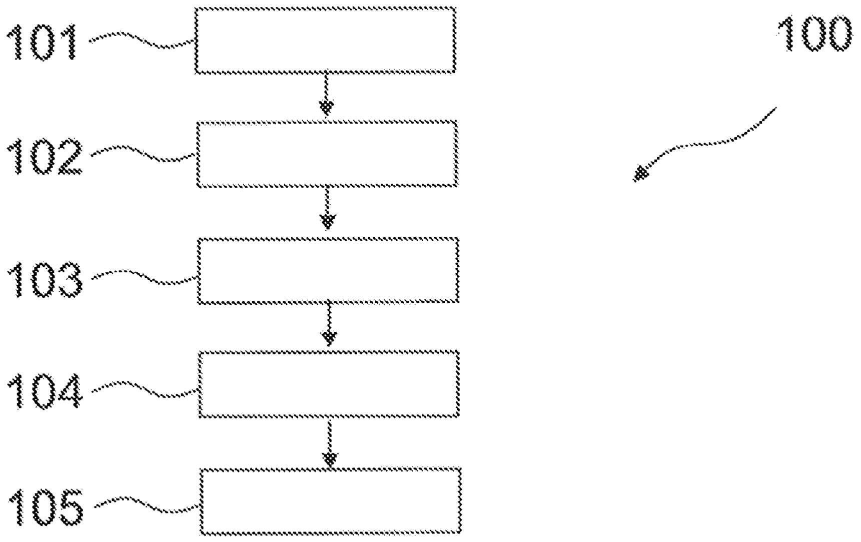
FIG. 2 shows a flow chart of a method of controlling the traffic system according to FIG. 1.
Figure 3:
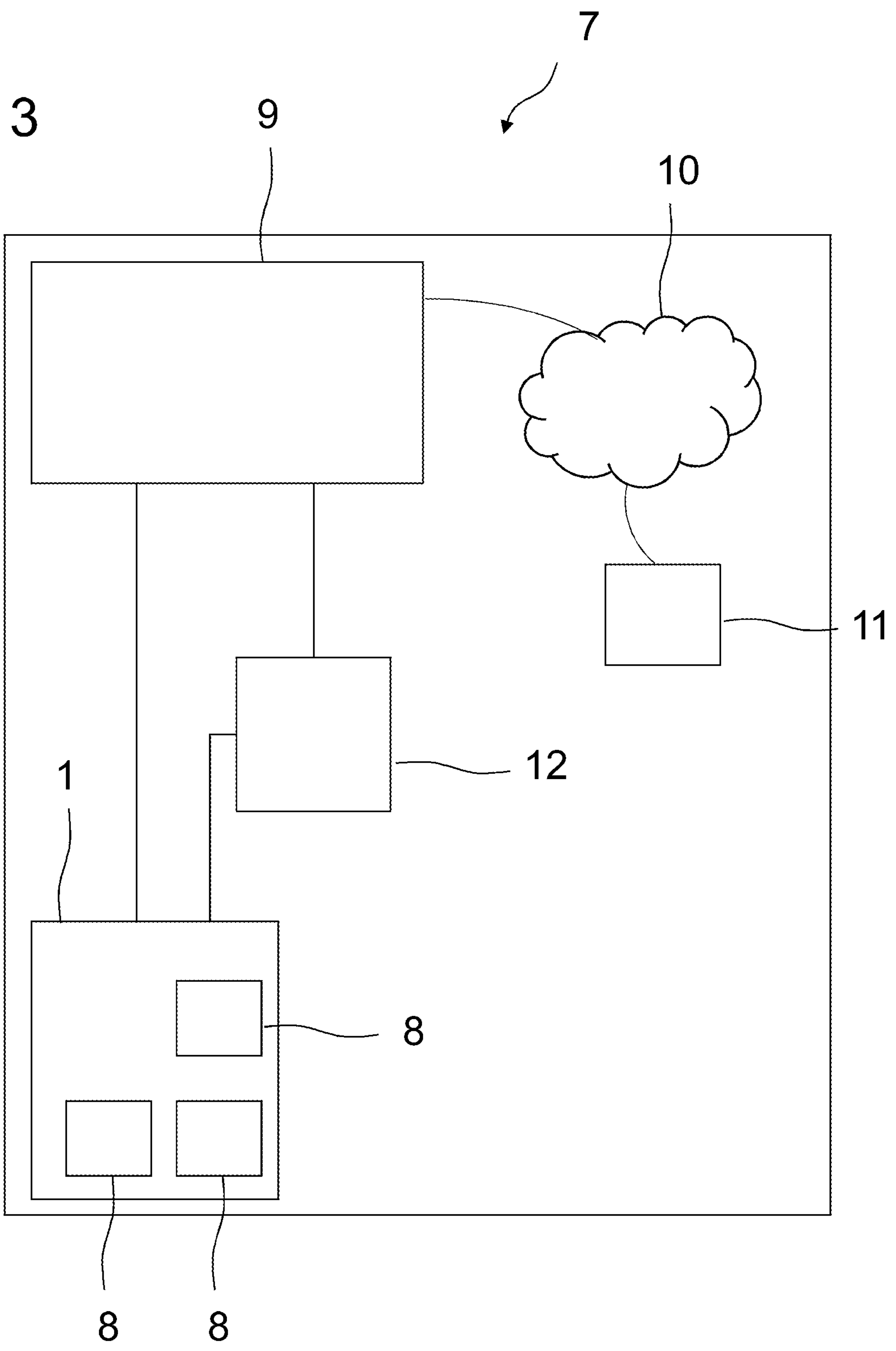
FIG. 3 shows a schematic representation of an apparatus that controls the traffic system according to FIG. 1.

With reference to FIGS. 2 and 3, it is described below how this improvement problem can be solved.

FIG. 2 shows a flow diagram of a method 100 of controlling the traffic system 1 according to FIG. 1.

In a first step 101, traffic loads 1 of the road sections 4 are detected. Traffic loads are detected for all road sections 4 of the traffic system 1. In an alternative example, it is also possible to only detect or take into account traffic loads of relevant road sections 4, i.e., those road sections 4 for which an improvement in the traffic system 1 is to be carried out.

The traffic loads 1 are detected, for example, by road sensors, via floating phone data (FPD) or floating car data (FCD). In addition or alternatively, historical data of the traffic system 1, i.e., empirical values from previous measurements or other values available with respect to the traffic of the traffic system, can also be used to detect the traffic loads 1.

In a second step 102, a local stress function f is determined for each road section 4 as a function of the recorded traffic loads 1 of the respective road sections 4. For the determination of the local stress function f of a road section 4, current switching times of traffic lights 5 of intersections 3 adjacent to this road section 4 can also be taken into account. In other words, it can be taken into account how many vehicles 6 enter the road section 4 under consideration in a next switching cycle and how many vehicles 6 leave it.

In a third step 103, a global stress function S for the entire traffic system 1 is determined based on the local stress functions $f_{n,m,d}^{rc,\ ro}(t+1)$ for all possible proportions of green phases at the entering and exiting intersections. The global stress function S is a measure of congestion or overload of the traffic system 1. A congestion of a few road sections 4 here provides a higher global stress value overall than a distribution of vehicles 6 in which the maximum possible stress-free number of vehicles 6 in the road sections 4 of the traffic system 1 is not exceeded, even if in the second example a total number of vehicles 6 travelling in the traffic system 1 is higher.

In a fourth step 104, using a quantum concept processor, improved switching times, i.e., improved lengths of green phases λ for the traffic lights 5 of the intersections 3, are determined. This is done by minimizing the function H, which in the part $H_1$ represents the global stress under the respective decision for the green portions at all traffic lights of the network. The improved switching times are determined such that the global stress function S assumes a smallest value that can be found. In other words, an improvement problem for the global stress function S is solved, whereby solving the improvement problem takes into account the traffic system 1 in its entirety and does not merely regulate switching times for traffic lights 5 of individual intersections 3 independently of each other. With the method 100 shown, improved switching times for all (or all relevant) traffic lights 5 are determined simultaneously, and thus a best possible system state for the entire traffic system 1, i.e., a system state with the smallest possible global stress, is determined.

In the traffic system 1 shown, only one type of traffic light is present at each intersection 3. However, the method 100 shown can also be used to consider different traffic light types at each intersection 3. For example, in addition to the traffic lights 5, there may also be turning lights or the like at all or some intersections 3. To improve the green phases λ for different traffic light types at an intersection 3, different values for r can be selected. These different values r then depend on each other, for example.

In a fifth step 105, the traffic lights 5 are switched according to a switching model based on the improved switching times. The switching model can, for example, be based directly on the improved switching times, i.e., each traffic light system 5 is switched directly according to the improved switching times. Alternatively, it is also possible to use a switching model that is based on these improved switching times, but additionally takes into account, for example, offsets, intermediate states such as yellow phases, additional traffic flows such as crossing tramways or turning lanes, or similar. Such additions can also be improved with the method 100.

The method 100 is, for example, periodically carried out in parallel with an ongoing operation of the traffic system 1. In this way, switching times for the traffic lights 5 that are adapted to a current traffic volume can always be determined. For example, the method 100 is carried out after a certain time has elapsed, for example, every 90 seconds, or at each cycle time $T_P$ for a subsequent cycle time. This cycle time $T_P$ can be predefined for all traffic lights 5, or there can be individual cycle times $T_P$ for different traffic lights 5. Alternatively or additionally, the method 100 can also be performed dynamically, for example, depending on a traffic volume or a global stress value in the traffic system 1.

The cycle time $T_P$ can also be improved, in addition or alternatively to the green phases λ. In this example, bits for the cycle times $T_P$ for each relevant intersection 3 must be added in the functions to be improved, or the bits described above must be replaced with them. The cycle times $T_P$ can also be taken into account for the local stress functions f and thus in particular be included in the future local stress f(t+1).

Furthermore, switching phases, i.e., offsets between cycle times $T_P$ of different traffic lights 5, can be improved in addition or alternatively to the green phases λ and the cycle times $T_P$. In this example, bits for the switching phases for each relevant intersection 3 must be added in the functions to be improved, or the bits described above must be replaced with them. The switching phases can also be taken into account for the local stress functions f and thus in particular be included in the future local stress f(t+1).

FIG. 3 shows a schematic drawing of an apparatus 7 that controls the traffic system 1 according to FIG. 1.

The apparatus 7 comprises sensors 8 with which traffic loads 1 of the road sections 5 can be recorded. The sensors 8 are, for example, road sensors, sensors that collect floating phone data (FPD) or sensors that collect floating car data (FCD).

The apparatus 7 further comprises a computing unit 9 that can determine local stress functions f for each road section 4 depending on the detected traffic loads 1 of the respective road section 4. Furthermore, the computing unit 9 can determine a global stress function S for the entire traffic system 1 based on the local stress functions f. For example, a conventional computer is used as computing unit 9. The computing unit 9 is connected to a network 10, for example, the Internet.

The apparatus 7 further comprises a quantum concept processor 11, which is arranged to determine improved switching times for the traffic lights 5, wherein the improved switching times are determined such that the global stress function S assumes a smallest value to be found.

The quantum concept processor 11 used is, for example, a processor set up to solve an improvement problem by quantum annealing simulation. Such a quantum concept processor 11 may, for example, be based on conventional technology, for example, complementary metal-oxide-semiconductor (CMOS) technology. Alternatively, however, any other quantum concept processors 11, including in the future those based on true quantum bit technologies, may be used for the apparatus 7.

The quantum concept processor 11 is also connected to the network 10. The computing unit 9 is arranged to send the global stress function S to the quantum concept processor 11 via the network 10. The quantum concept processor 11 then sends the determined improved switching times back to the computing unit 9 via the network 10.

The apparatus 7 further comprises a switching device 12 arranged to switch the traffic lights 5 according to a switching model, the switching model being based on the improved switching times. The switching device 12 is here connected to the computing unit 9 so that the computing unit controls the switching device 12 based on the improved switching times.

The invention claimed is:

1. A method of controlling a traffic system having a plurality of intersections with switchable traffic lights and road sections located between the intersections, the method comprising:

detecting traffic loads of multiple relevant road sections, determining a local stress function for each relevant road section depending on the detected traffic load of the respective relevant road section, determining a global stress function for the entire traffic system based on the local stress functions, determining, using a quantum concept processor, improved switching times for the traffic lights of the intersections adjacent to the relevant road sections simultaneously, wherein the improved switching times are determined such that the global stress function reaches a smallest detectable value, and switching the traffic lights according to a switching model based on the improved switching times.

2. The method according to claim 1, wherein the global stress function is defined as a quadratic optimization term or as a QUBO (Quadratic Unconstrained Binary Optimization) term.

3. The method according to claim 1, wherein the smallest detectable value of the global stress function is a local or absolute minimum of the global stress function.

4. The method according to claim 1, wherein the determining of the local stress function is additionally performed based on selected values for different possible green phases for traffic lights adjacent to the respective relevant road section.

5. The method according to claim 1, further comprising:

loading historical data of the traffic system, wherein further the determining of the local stress functions is performed taking into account the historical data.

6. The method according to claim 1, wherein the determining of the local stress functions, the determining of the global stress function, the determining of the improved switching times, and the switching of the traffic lights is periodically repeated and the improved switching times are constantly determined for a next switching period.

7. The method according to claim 6, wherein the detecting of the traffic loads is periodically repeated.

8. The method according to claim 1, wherein a number of vehicles on the respective relevant road section is detected for detecting the traffic loads.

9. The method according to claim 1, wherein current switching times of the traffic lights of intersections adjacent to the respective relevant road section are further taken into account to determine the local stress function.

10. An apparatus that controls a traffic system with a plurality of intersections with switchable traffic lights and road sections located between the intersections, the apparatus comprising:

at least one sensor arranged to detect traffic loads of multiple relevant road sections, a computing unit arranged to determine a local stress function for each relevant road section depending on the detected traffic load of the respective relevant road section and arranged to determine a global stress function for the entire traffic system based on the local stress functions, a quantum concept processor arranged to determine improved switching times for the traffic lights of the intersections adjacent to the relevant road sections simultaneously, the improved switching times being determined such that the global stress function reaches a smallest detectable value, and a switching device arranged to switch the traffic lights in accordance with a switching model, the switching model being based on the improved switching times.

11. The apparatus according to claim 10, wherein the quantum concept processor is a processor arranged to solve an improvement problem using quantum annealing simulation.

12. A non-transitory computer-readable storage medium on which a computer program comprising instructions that, when the program is executed by a computing device, cause the computing device to perform the method of claim 1 is stored.

* * * * *